Oct. 21, 1941.  R. R. RANEY  2,259,908
PICKUP BALER
Filed Dec. 1, 1938   4 Sheets-Sheet 1

Inventor
Russell R. Raney
By [signature]
Att'y.

Inventor
Russell R. Raney.
By [signature]
Att'y.

Oct. 21, 1941.    R. R. RANEY    2,259,908
PICKUP BALER
Filed Dec. 1, 1938    4 Sheets-Sheet 4

Inventor
Russell R. Raney
By
Att'y.

Patented Oct. 21, 1941

2,259,908

UNITED STATES PATENT OFFICE 2,259,908

PICKUP BALER

Russell R. Raney, Auburn, N. Y., assignor to International Harvester Company, a corporation of New Jersey Application December 1, 1938, Serial No. 243,412

3 Claims. (Cl. 56—364)

This invention relates to a pick-up baler. More specifically, it relates to the pick-up unit for such pick-up balers.

Pick-up balers are well known which comprise a pick-up unit, a baler unit and conveying means therebetween. These balers are adapted to be moved over the ground and pick up cut materials such as hay and to bale it as the machines are in motion. Sometimes, it is desirable to move the machine quite fast over the ground, and in this case the cut material is to be picked up faster. In such a case, it has been customary to drive the pick-up unit from a ground wheel so that the speed of the pick-up unit is proportional to the speed of the pick-up unit over the ground. In some instances, however, the machine must be moved over the ground very slowly since the cut material may be in considerable piles. In these cases, the pick-up unit would be driven too slowly by the ground wheel. Consequently, it is desirable to have some arrangement for keeping the speed of the pick-up unit above a certain minimum.

An object of the present invention is to provide a combination ground and power drive for a pick-up unit.

A further object is the provision of guiding means between the pick-up unit and the baler unit for holding the pick-up unit in line regardless of the position to which it is tilted.

Another object is to provide a novel frame structure for supporting the pick-up unit.

Still another object is the provision of means for controlling the adjustment of the pick-up unit from a point immediately adjacent the point where adjustment is to be made, as well as from an operator's platform adjacent the cross conveyer.

A further object is the provision of an improved mode for suspending a wire tier's platform from a baler unit.

Other objects will appear from the disclosure.

The pick-up baler of the present invention comprises a baler unit, a pick-up unit and a conveying mechanism therebetween. A pair of shafts is mounted beneath the pick-up unit, and on these shafts is mounted a pair of overrunning clutches. To one of these clutches is connected a driving means connected with the baler unit for the pick-up unit. With the other clutch, there is a connection with a ground wheel supporting the pick-up baler. By this arrangement, the speed of the pick-up unit is kept up to a certain minimum by means of the drive connected with the power unit. When the speed of the pick-up baler over the ground exceeds a certain minimum, then the ground drive drives the pick-up unit above the minimum speed at which it is kept by the power unit. The pick-up unit is supported on an A-frame connected to the main axle with provision for adjustment of the unit with respect to the A-frame at the end away from the axle. Means for effecting this adjustment may be controlled either immediately adjacent this end or from an operator's station adjacent the cross conveyer. There are wire tier's platforms supported at either side of the baler unit by means of U-shaped members.

Figure 1:
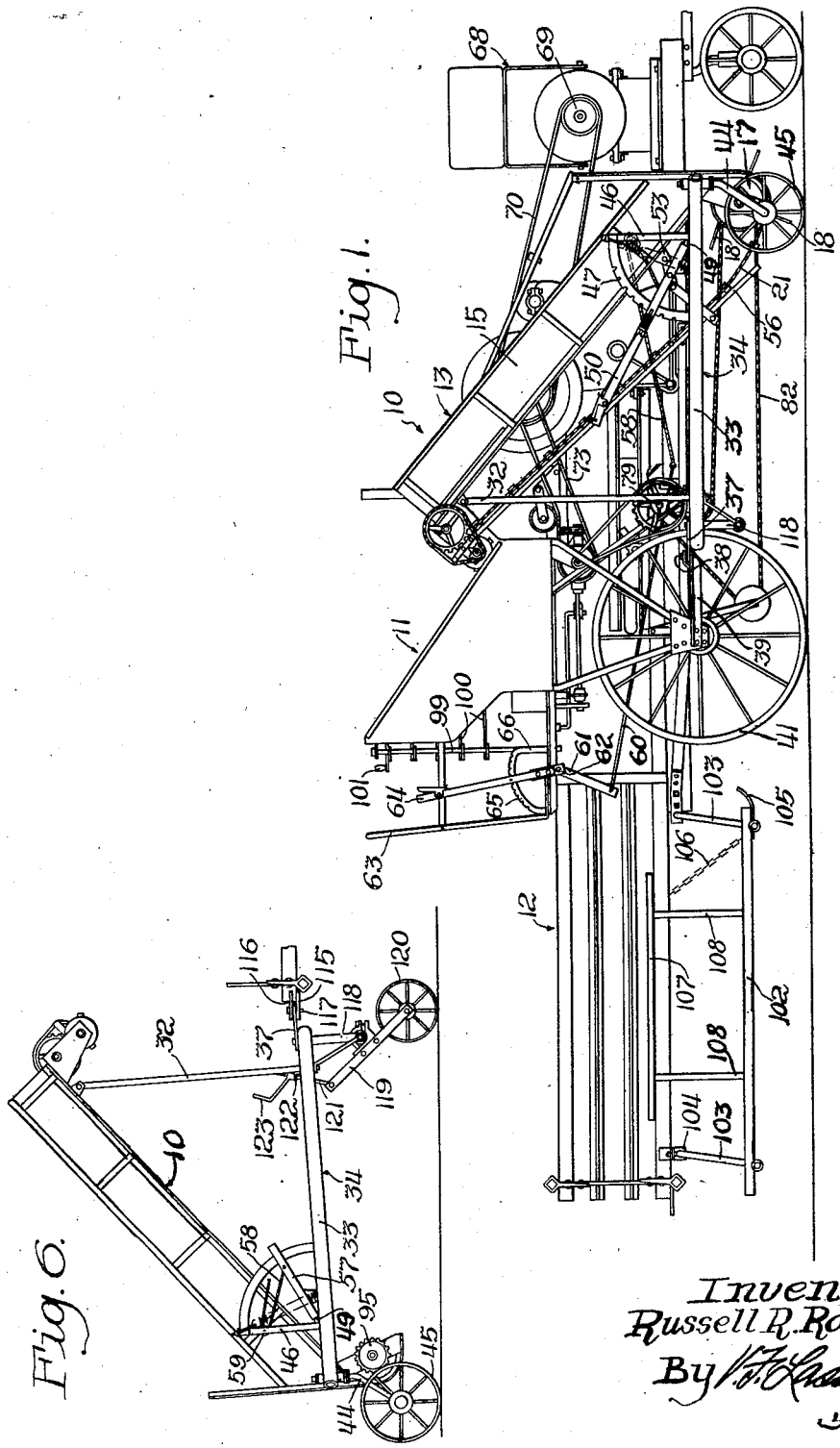
Figure 1 shows the pick-up baler in side elevation.

The pick-up baler of the present invention comprises a pick-up unit 10, a conveyer mechanism 11 and baler unit 12. The pick-up unit includes a body 13 having a floor 14 and sides 15. At the lower end of the body 13 is a cylinder 17 having tines 18 thereon and lugs 19, between which fit slats 20, which move upwardly over the floor 14 of the body. The ends of the slats are attached to chains 21 at opposite sides of the body 13. One of these chains drives a sprocket 22, which in turn drives a shaft 23 to which is secured sprocket 24. The sprocket 24 drives a chain 25 which in turn drives a sprocket 26 secured to the end shaft 27 on which a roll 28 is mounted having lugs 29.

Figure 2:
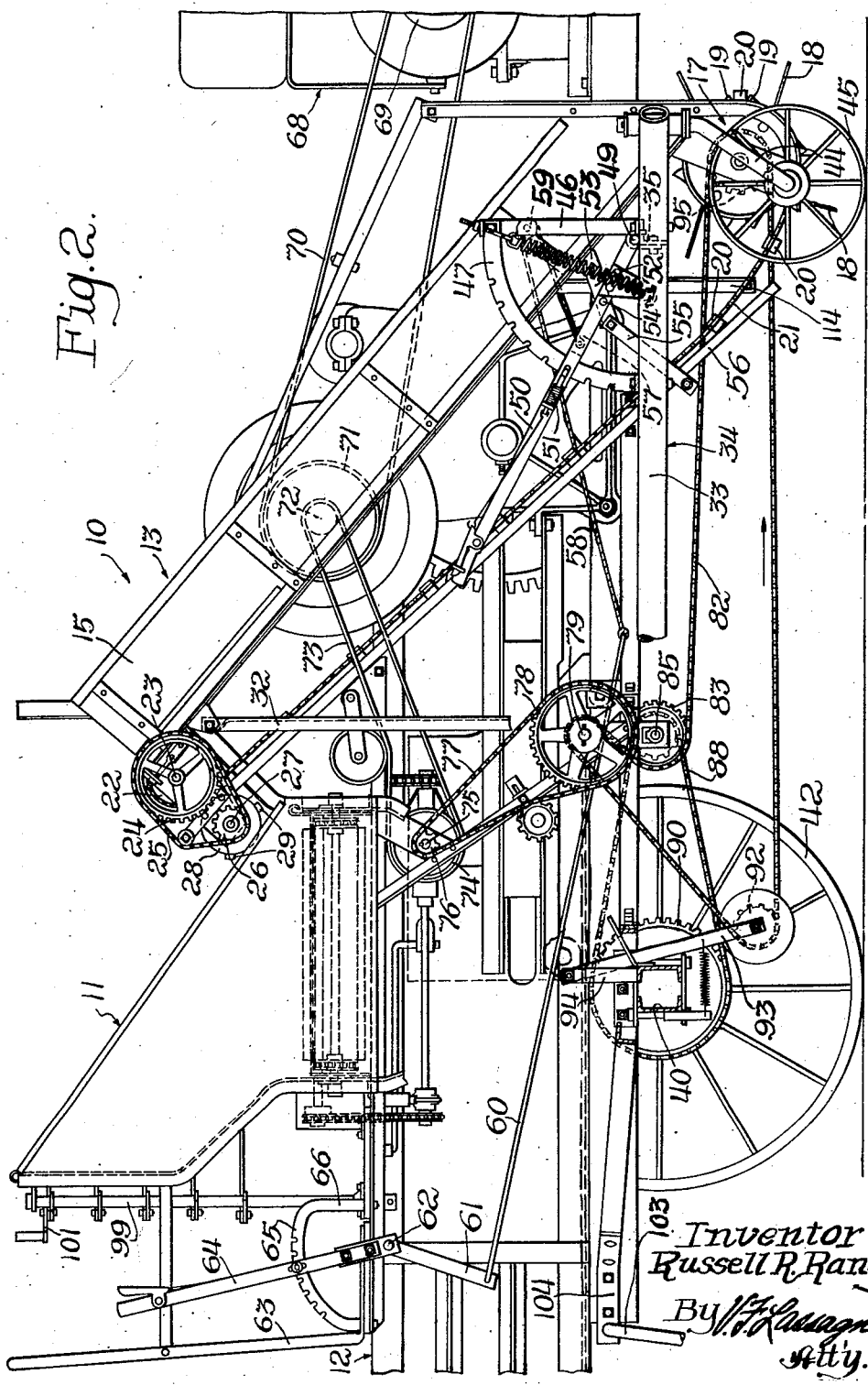
Figure 2 is a side elevation, partially in section on an enlarged scale, of a portion of the pick-up baler with certain parts omitted.

The upper end of the body 13 is pivoted on an upright U-shaped member 32, which is secured to legs 33 of an A-frame member 34 having a transverse connecting piece 35. The converging ends of the legs 33 are secured to a plate 37, pivotally secured in turn by a pin 38 to a bracket 39 attached to the end of an axle 40. This axle extends the entire width of the pick-up baler and is supported at one end on a wheel 41 and at the other end on a wheel 42. The front end of the A-frame is supported on axles 44 and wheels 45. As shown in Figure 2, there is mounted upon the transverse member 35 an upright piece 46. An arcuate tooth member 47 is secured to the member 46 and to the one side piece 33 of the A-frame. A rock-shaft 49 is rotatably secured to the transverse member 35 and has secured thereto a lever 50 having detent mechanism 51 thereon adapted to engage the arcuate tooth member 47. A link 52 is pivotally secured to the under side of the body 13 by means of a lug member 53 and is also pivotally secured to the lever 50 at 54. A bail member 55 is also pivotally secured to the link 52 and supports an apron 56 adapted to support the slats 20 beneath the body 13. The apron 56 is thus adjusted automatically during raising or lowering of the pick-up body.

Figure 3:
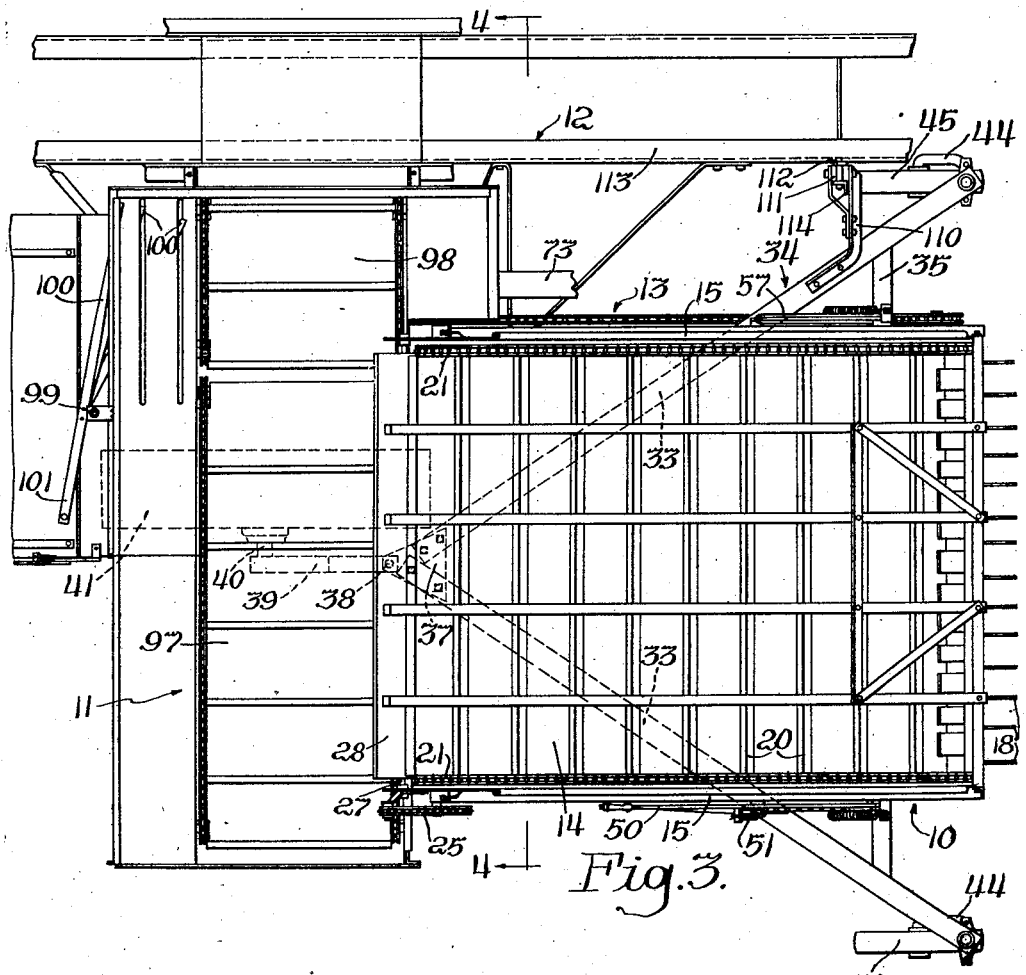
Figure 3 is a plan view of the parts of Figure 2.

The mechanism just described is at the lower side of the pick-up unit, as viewed in Figure 3. A similar mechanism is located at the other side. However, in this case, there is a short arm 57 secured to the rock-shaft 49 in parallel relation to the lever 50. A flexible member 58 is connected to this arm 57 and extends around a sheave 59 to a connection with a rod 60 secured in turn to an arm 61 pivotally secured at 62 to the under side of an operator's platform 63. A lever 64 having detent mechanism thereon is also pivotally mounted at 62 so as to swing with the arm 61 and is adapted to be locked to an arcuate tooth portion 65 of a bent member 66 secured to the operator's platform 63. By means of the mechanism just described, the position of the lower end of the body 13 may be regulated. By the lowering of the lever 50 the lower or forward end of the body 13 is lowered. A raising of the lever effects a raising of this same end of the body. With the detent mechanism 51 held out of engagement with the arcuate tooth member 47, as shown in Figure 2, control of the lower end of the body 13 is had through the lever 64.

A power unit 68 is mounted at the front of the pick-up baler and drives, by means of a pulley 69, a belt 70 which in turn drives a pulley 71. The pulley 71 is coaxially mounted with a pulley 72 driving the same, and this pulley 72 drives a belt 73, in turn driving a pulley 74. The pulley 74 is mounted on a shaft 75 which it drives. Also, mounted on this shaft is a sprocket 76 driven by the shaft 75 and the sprocket 76 in turn drives a chain 77. The chain 77 drives a sprocket 78 mounted upon a shaft 79 and arranged to drive the same through an overrunning clutch 80. A sprocket 81 is mounted on the shaft 79 and driven by it, and drives in turn a chain 82. The chain 82 drives a sprocket 83 secured to a slip clutch 84 mounted upon one end of a shaft 85. At the other end of the shaft 85 is an overrunning clutch 86 connected with a sprocket 87 having a chain 88 in meshing engagement therewith. The chain 88 also engages a sprocket 90 driven by the wheel 42. The chain 82, which is in engagement with the sprockets 81 and 83, is also in engagement with a tightener sprocket 92 supported upon an arm 93 pivotally attached to a piece 94 connected to the axle 40, as shown in Figure 2. It is also in mesh with a sprocket 95 driving the roll 17, and conveyer composed of slats 20 and chains 21.

It will be seen that with the above described arrangement there is interdependent ground and power drive of the pick-up unit. The power unit 68, acting through the pulley 78 and the overrunning clutch 80, drives the chain 82 which in turn drives the sprocket 95, the cylinder 17, and the chains 21 supporting the slats 20. The power unit is run at a constant speed, and so the speed of the pick-up unit is also constant. When, however, the speed of the pick-up baler over the ground exceeds a certain amount, the wheel 42, acting through the sprocket 87 and the overrunning clutch 86, drives the shaft 85, sprocket 83 and chain 82 faster than it would otherwise be driven by means of the power unit 68. Accordingly, there is an overrunning of the clutch 80. The chain 82 is driven faster and in proportion with the speed of the wheel 42. Consequently, the pick-up unit, i. e., the speed of the slats 21 over the floor 15 of the body 13, is also increased and is kept in proportion with the speed of the wheel 42 or with the speed of the pick-up baler over the ground. If now the speed of the pick-up baler over the ground is so slow that the wheel 42 cannot drive the chain 82 as fast as the power unit 68 drives it, then the power unit drives this chain at the predetermined minimum speed and there is an overrunning of the clutch 86. From this it will be seen that the speed of the pick-up unit is proportional to the speed of the pick-up baler over the ground down to a predetermined speed of the pick-up baler, below which the speed of the pick-up unit is held constant.

The conveying mechanism between the pick-up unit and the baler unit will be described only briefly since it forms no part of the present invention, but is described in detail and claimed in the co-pending application of Clemma R. Raney, filed Oct. 8, 1938, Serial No. 233,998. Briefly, the conveyer mechanism 11, as shown in Figure 3, comprises a long conveyer 97 adjacent the pick-up unit and a short conveyer 98 adjacent the baler unit 12. Rearwardly of the two conveyers 97 and 98 is a vertical shaft 99 to which is secured a plurality of fingers 100 and a handle 101. The arrangement is such that when it is desired to set a block in the baling chamber 12, the handle 101 is swung clockwise, as viewed in Figure 3, to bring the fingers 100 into a position between the conveyers 97 and 98 and to cause a stopping of the conveyer 97. Thus, no material is fed from the conveyer 97 to the conveyer 98 and the conveyer 98 quickly clears itself, thus effecting a clear separation of the stream of hay going into the baler unit 12. This is a requisite for the proper setting of the block at the baler unit.

Secured at the rear of the baling unit 12 and hung underneath it at both sides is a pair of platforms 102. These platforms are supported by a pair of generally U-shaped members 103 secured in bracket members 104 at the underside of the baler unit 12. At the end of each platform 102 toward the pick-up unit is a bent nose member 105. A pair of chains 106 connects the platforms and the baler unit 12. There is a seat 107 supported over each platform by means of connecting members 108. A wire tier may stand on either one of the platforms 102 when the pick-up baler is in operation and moving over a field. If the wheels 41 and 42 go into a depression in the ground, the nose members 105 will strike the ground and allow the platforms 102 to swing rearwardly and upwardly. Thus, there will be no damage to these platforms. The chain 106 limits the forward movement of these platform structures.

Figure 5:
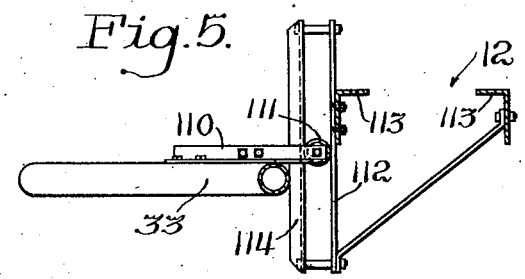
Figure 5 is a detail view showing a slidable connection between the pick-up unit and the baler unit; and, Figure 6 shows the pick-up unit in transport position.
Figure 4:
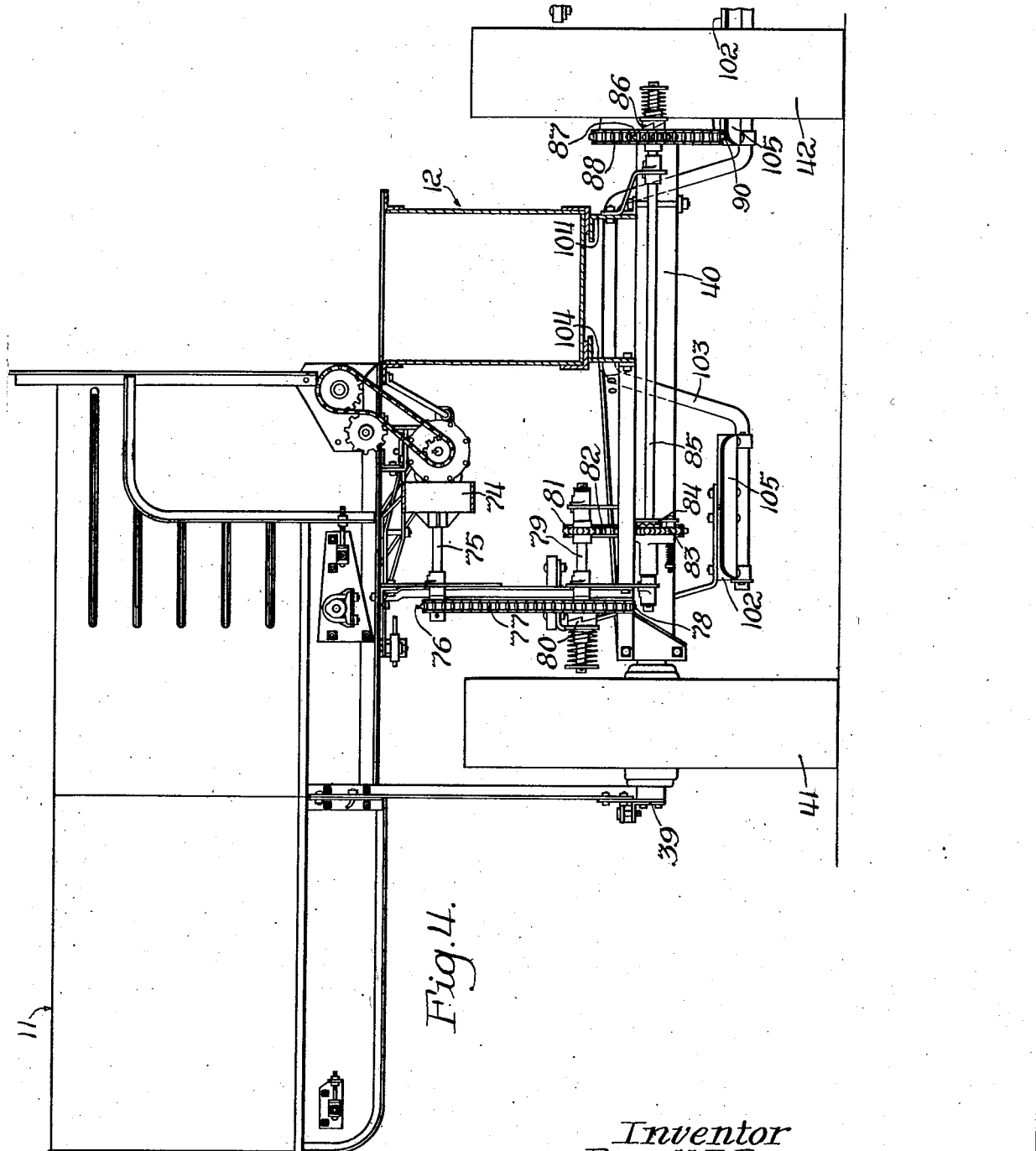
Figure 4 is a sectional view taken along the lines 4—4 of Figure 3.

Figure 5 shows an arrangement of parts by which the A-frame 34, supporting the pick-up unit, is prevented from swinging away from the baler unit 12. The member 110 is secured to one of the pieces 33 of the A-frame and has at one end a roller 111 which fits between a part 112 bolted to angle members 113 forming a part of the frame of the baler unit 12, and an angle member 114 secured in spaced relation to the member 112. The roller 111 is adapted to ride in the space between the members 112 and 114 and thus the A-frame 34 is kept in fixed relation with respect to the baler 12 regardless of how the A-frame may pivot up or down. The arc on which the A-frame 34 swings about the axis of the axle 40 is so small that there is not much deviation from a straight line movement. Furthermore, the parts 112 and 114 do not confine the roller 111 in a direction toward or away from the axle 40, and consequently there is provision for the relative movement of the roller 111 with respect to the parts 112 and 114 which is not strictly in a straight line.

Figure 6 shows the pick-up unit 10 in transport position. The unit has been detached from the bracket 38 and is attached between two spaced pieces 115 and 116 at the rear of the baler unit 20 by means of a bolt 117 and the piece 37 secured to the A-frame 34. A U-shaped member 118 extends downwardly from the A-frame 34 and on a shaft extending between the legs of the U-shaped member is pivoted a member 119 having at one end a wheel 120. At the other end of the member 118 is secured a threaded bolt 121 which extends through a bracket member 122 secured to the A-frame 34. A crank 123 is threaded on to the bolt and by means of this the angular position of the member 119 is adjusted and, consequently, the height of the A-frame. Thus, the A-frame may be raised into a position where it may be attached to the members 115 and 116 at the rear of the baler unit 12.

It will be seen from the foregoing description that a novel pick-up baler unit has been provided in which there is a new and improved drive for the pick-up unit. By means of overrunning clutches there has been provided an interdependent ground and power drive for the pick-up unit. This operates in such a manner that the speed of the pick-up unit is proportional to the speed of the pick-up baler down to a certain predetermined speed of the pick-up baler below which the speed of the pick-up unit is held constant. In addition, a novel arrangement has been devised for holding the supporting frame of the pick-up unit in fixed spaced relation with respect to the baler unit. The pick-up unit is supported on an A-frame connected to the main axle with provision for adjustment of the unit with respect to the A-frame at the end away from the axle. Means for effecting this adjustment may be controlled either immediately adjacent this end or from an operator's station adjacent the cross conveyer. There are platforms supported by means of crank-shaped members.

The intention is to limit the invention only within the terms of the appended claims.

What is claimed is:

1. In combination, means for gathering cut material, a wheel connected thereto and adapted to travel over the ground, a power unit, a pair of shafts mounted on the gathering means, a driving connection between the shafts and gathering means, a first overrunning clutch having one side connected to one shaft and the other side connected to the power unit, and a second overrunning clutch having one side connected to the other shaft and the other side connected to the wheel.

2. In combination, a harvester movable over the ground and comprising a supporting frame, crop-gathering means supported thereby, and a ground wheel, a power unit movable over the ground with the harvester, a first drive means connecting the gathering means and the power unit for driving the gathering means from the power unit and including a first overrunning clutch, and a second drive means connecting the gathering means and the ground wheel for driving the gathering means from the ground wheel and including a second overrunning clutch, whereby, when the ground speed of the harvester is below a predetermined amount, the second overrunning clutch overruns, and the gathering means is driven from the power unit, and, when the ground speed of the harvester is above the predetermined amount, the first overrunning clutch overruns, and the gathering means is driven from the ground wheel.

3. In combination, a pick-up baler movable over the ground and comprising a ground wheel, a first supporting frame, a baler carried thereby, a power unit also carried thereby, means connecting the power unit with the baler for driving the same, a second supporting frame connected with the first supporting frame, and a pick-up device carried by the second supporting frame, a first drive means connecting the pick-up device with the power unit for driving the pick-up device from the power unit and including a first overrunning clutch, and a second drive means connecting the pick-up device and the ground wheel for driving the pick-up device from the ground wheel, whereby, when the ground speed of the pick-up baler is below a predetermined amount, the second overrunning clutch overruns, and the pick-up device is driven by the power unit, and, when the ground speed of the pick-up baler is above the predetermined amount, the first overrunning clutch overruns, and the pick-up device is driven by the ground wheel.

RUSSELL R. RANEY.